H. F. BALL.
WOODEN RIM WHEEL.
APPLICATION FILED AUG. 27, 1908.
918,945.
Patented Apr. 20, 1909.
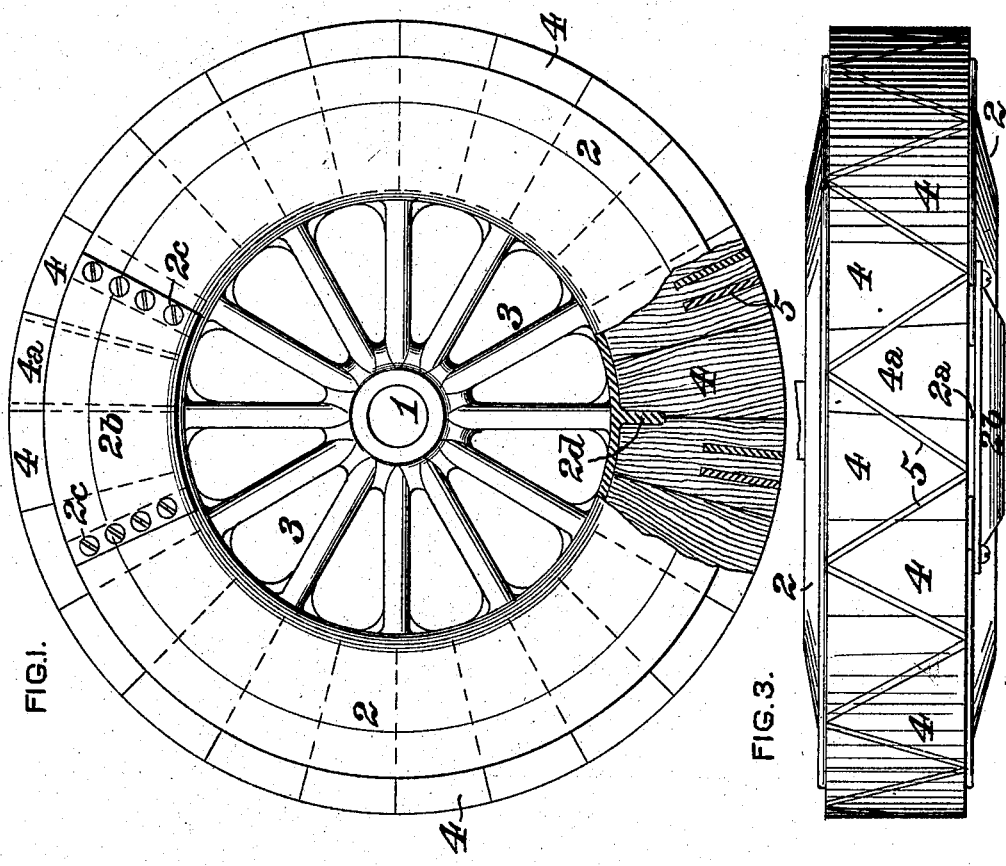
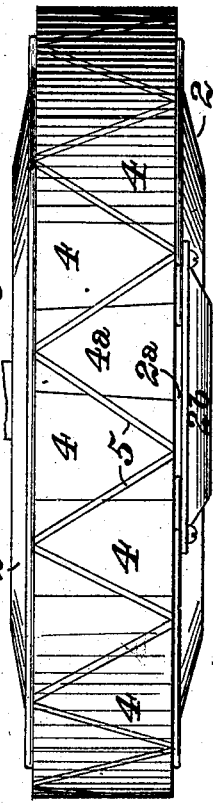
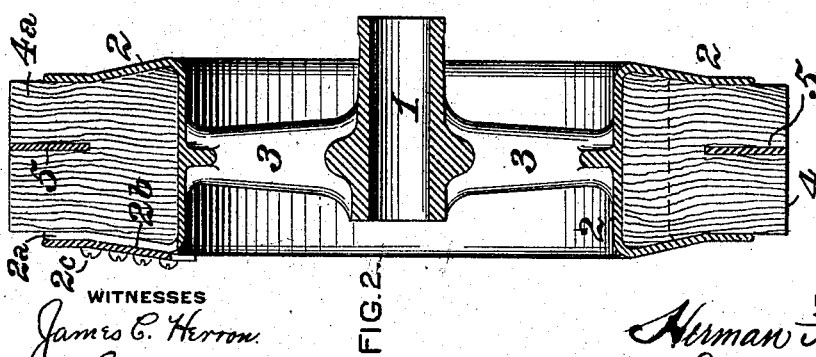
WITNESSES
INVENTOR
Herman F. Ball
Att'y

UNITED STATES PATENT OFFICE.

HERMAN F. BALL, OF NEW YORK, N. Y., ASSIGNOR TO AMERICAN LOCOMOTIVE COMPANY, OF NEW YORK, N. Y., A CORPORATION OF NEW YORK.

WOODEN-RIM WHEEL.

No. 918,945.    Specification of Letters Patent.    Patented April 20, 1909.

Application filed August 27, 1908. Serial No. 450,426.

*To all whom it may concern:*

Be it known that I, HERMAN F. BALL, of the borough of Manhattan, in the city and State of New York, have invented a certain new and useful Improvement in Wooden-Rim Wheels, of which improvement the following is a specification.

The object of my invention is to provide a wheel having a wooden tread or face, which shall be of simple and inexpensive construction, and in which the blocks composing the rim may be readily inserted in the body of the wheel and securely held against accidental displacement therefrom.

The improvement claimed is hereinafter fully set forth.

In the accompanying drawings: Figure 1 is a side view, partly in section, of a wooden rim wheel illustrating an embodiment of my invention; Fig. 2, an axial section through the same; and Fig. 3, a plan or top view.

In the practice of my invention, I provide a wheel center comprising a hub, 1, a rim casing, 2, and a plurality of radial spokes or arms, 3, connecting the hub and rim casing. The entire wheel center is, preferably, as shown in the drawings, an integral metal structure, although other material might, if preferred, be used for the hub and spokes.

The rim casing, 2, is an annulus of channel form, which is entirely open between the peripheries of its side plates or flanges, and is of inwardly tapering transverse section from its base ring toward the peripheries of its side plates as shown in Fig. 2, in order to retain within it a rim composed of a plurality of blocks of wood, 4, and a key block, 4ª, presently to be described. The side plates of the rim casing may be either tapered only for a portion of the distance from the base ring to their peripheries, as shown, or throughout their entire outward projection, as preferred. An opening 2ª, is formed in one of the side plates, said opening being closed by a removable cover plate, 2ᵇ, which is secured to the side plate by screw bolts or rivets, 2ᶜ, and a stop plate, 2ᵈ, is formed on the base ring and projects outwardly therefrom, on the opposite side of the axis of the wheel center from the opening, 2ª.

The space between the side plates or flanges of the wheel center is filled up with a sectional or built up rim, composed of a plurality of wooden blocks, 4, and a key block, 4ª, which fit closely between the side plates, and are preferably set with the grain of wood extending, as nearly as practicable, radially, and project beyond the peripheries of the side plates, their outer faces being curved concentrically with the hub and base ring of the wheel center and constituting the tread or bearing face of the wheel. The blocks, 4 and 4ª, are of substantially trapezoidal section in planes at right angles to the axis of the wheel, and of rectangular section in planes intersecting radii of the wheel, except as to the key block, 4ª, the sides of which are tapered or inclined from one of its faces which abuts against a side plate of the rim casing to the other, and the two adjoining blocks, 4, the abutting faces of which blocks on the key block are similarly tapered or inclined. Steel plates, 5, are driven into the blocks, 4 and 4ª, radially and at angles to the axis of the wheel, in order to improve its wearing qualities and increase its tractive effect.

In assembling and locating the blocks of the wooden rim, two blocks, 4, are inserted in, and driven in opposite directions, around, the space between the side plates of the rim casing, until they abut against the opposite sides of the stop plate, 2ᵈ, and other blocks, 4, are successively inserted and similarly moved around the rim casing until the space between its side plates is filled, except for a distance between the two blocks last inserted, into which the inclined sided key block, 4ª, is driven, thereby locking all the blocks, 4, in position. The cover plate, 2ᵇ, is then secured to the rim casing, and in connection with the key block and the inclined side plates of the rim casing, holds the blocks forming the rim securely in position.

It will be seen that the wheel is not expensive in manufacture, and that its construction is such as to provide a sectional wooden rim, the members of which can be readily inserted and removed as required, and, when located in operative position, will be effectually prevented from being displaced.

I claim as my invention and desire to secure by Letters Patent:

1. The combination of a wheel center having a rim casing of channel section which narrows or tapers inwardly toward the periphery of the casing, and is provided with a lateral opening, a plurality of wooden rim blocks insertible through said opening and fitting in said rim casing, a stop plate fixed to the rim casing and interposed between two of the rim blocks, and a cover plate closing the lateral opening of the rim casing.

2. The combination of a wheel center having a rim casing of channel section which narrows or tapers inwardly toward the periphery of the casing, and is provided with a lateral opening, a plurality of wooden rim blocks insertible through said opening and fitting in said rim casing, a stop plate fixed to the rim casing and interposed between two of the rim blocks, an inclined sided key block interposed between two rim blocks having correspondingly inclined sides, and a cover plate closing the lateral opening of the rim casing.

HERMAN F. BALL.

Witnesses:
J. B. Ewins,
H. M. Sloat.